United States Patent [19]

Wood

[11] Patent Number: 5,429,438
[45] Date of Patent: Jul. 4, 1995

[54] MECHANICAL STRUCTURE AND GUIDE BLOCK

[75] Inventor: John D. Wood, Fort Wayne, Ind.

[73] Assignee: 80/20 Inc., Fort Wayne, Ind.

[21] Appl. No.: 90,297

[22] Filed: Jul. 12, 1993

[51] Int. Cl.⁶ ............................................. F16C 29/02
[52] U.S. Cl. ......................................... 384/42; 384/26
[58] Field of Search ...................... 384/7, 9, 26, 41, 42

[56] References Cited

U.S. PATENT DOCUMENTS

| | | | |
|---|---|---|---|
| 3,338,642 | 8/1967 | Ortelli . | |
| 4,566,738 | 1/1986 | Fasth | 384/42 X |
| 4,773,769 | 9/1988 | Church | 384/42 |
| 4,856,415 | 8/1989 | Noda | 92/88 |
| 4,925,320 | 5/1990 | Foster et al. | 384/41 X |
| 4,978,233 | 12/1990 | Stötzel et al. | 384/12 |
| 4,986,155 | 11/1990 | Bode | 384/45 |
| 5,055,091 | 10/1991 | Morris, Jr. et al. | 414/621 |
| 5,143,454 | 9/1992 | Morita | 384/37 |
| 5,181,780 | 1/1993 | Morita | 384/8 |

FOREIGN PATENT DOCUMENTS

| | | | |
|---|---|---|---|
| 482268 | 4/1992 | European Pat. Off. | 384/26 |
| 2802740 | 9/1978 | Germany | 384/42 |
| 4118479 | 1/1992 | Germany | 384/42 |
| 2-266112 | 10/1990 | Japan | 384/42 |
| 4-203619 | 7/1992 | Japan . | |

Primary Examiner—Thomas R. Hannon
Attorney, Agent, or Firm—Barnes & Thornburg

[57] ABSTRACT

A mechanical structure comprising at least one extrusion having a plurality of sides and a longitudinal slot generally centrally positioned in each side, a guide block having a plurality of guide surfaces disposed adjacent respective ones of the plurality of sides of the extrusion, and a plurality of wear pads disposed between respective surfaces of the extrusion and guide surfaces of the guide block to reduce friction between the same, each wear pad having an alignment key positioned to be received within one of the slots of the extrusion, and a plurality of wear surfaces in load bearing contact with the adjacent surfaces of the extrusion.

25 Claims, 3 Drawing Sheets

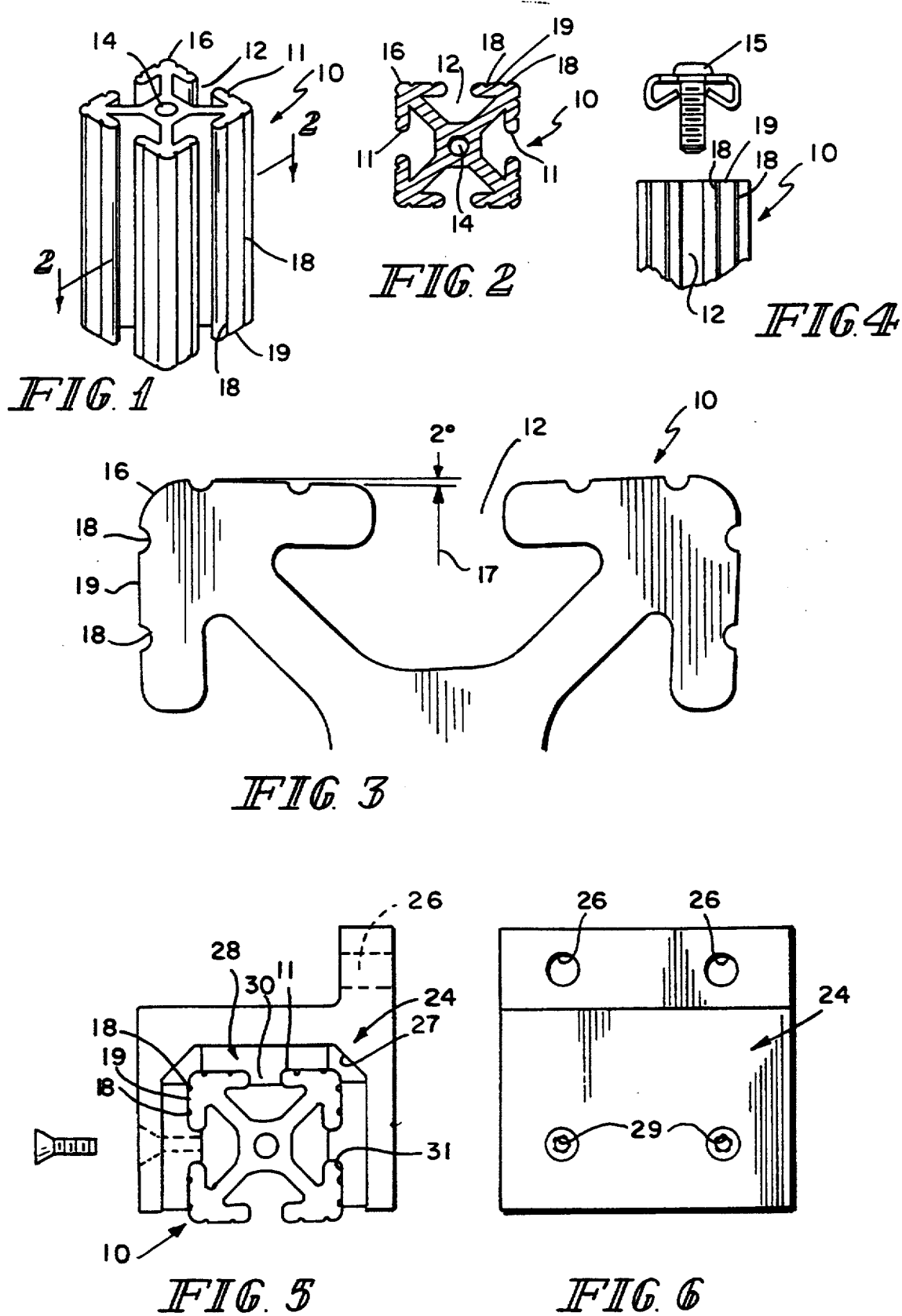

MECHANICAL STRUCTURE AND GUIDE BLOCK

BACKGROUND AND SUMMARY OF THE INVENTION

The present invention relates to a mechanical structure and a sliding member for mounting on the mechanical structure. More particularly, the present invention relates to a mechanical structure constructed from components that include one or more extrusions and a linear bearing assembly for slidably mounting to extrusions utilized in constructing the mechanical structure.

Modular construction of mechanical structures that include one or more extrusions as components is known. These extrusions may be constructed from material such as aluminum or an aluminum alloy. Aluminum or aluminum alloy has the advantage of allowing for the use of a lighter weight material in a mechanical design. Aluminum weighs only about one-third as much as materials such as iron, steel, copper, or brass from which many mechanical structures are constructed. At least one advantage of the use of such lightweight materials is reduced shipping and handling costs. In addition, aluminum has a higher strength-to-weight ratio than materials such as copper, carbon steel (A36), and stainless steel. The strength-to-weight ratio is a material's ultimate tensile strength divided by its density. The combination strength and light weight of aluminum have resulted in its widespread use in industries such as aerospace, machine building, and transportation.

Extrusions allow for modular construction of a variety of mechanical structures. These extrusions can be interconnected by various plates, fasteners, and studs such that welding for interconnection, as required with some conventional metals such as steel, is not required. Because welding is not required, heat stress and warpage of the components used to construct a mechanical structure is not a problem. In addition, elimination of welding makes construction of mechanical structures less expensive and less time consuming. Furthermore, elimination of welding and use of plates, fasteners, and studs for interconnection of extrusions results in mechanical structures that can be easily disassembled, with the extrusions thereof reused to construct additional mechanical structures.

Use of linear bearing assemblies is known. These bearing assemblies provide a means for integrating guided linear motion along at least a portion of a mechanical structure. Linear bearing assemblies are slidably mounted on a guide rail such that they are movable along at least a portion of the longitudinal length of the guide rail. Wear pads or other friction reducing structures having a low coefficient of friction are often disposed between the linear bearing and the guide rail.

A current mechanical structure constructed at least in part from one or more extrusions in which it was desired to integrate guided linear motion along at least a portion of an extrusion of the mechanical structure would require the attachment of a guide rail to the extrusion. This attachment would require utilization of such means as screws, bolts, rivets, or welding. Thus, many of the above-described advantages associated with modular construction of mechanical structures via the utilization of extrusions would be eliminated. A linear bearing assembly for releasably mounting directly to an extrusion of a mechanical structure would be a welcome improvement. As long as the linear bearing assembly could be removed from the extrusion without partial or complete destruction thereof, the above-described advantages associated with both the use of extrusions in the construction of mechanical structures and linear bearing assemblies therein would be maintained.

Accordingly, a mechanical structure is provided that includes a frame having at least one extrusion that has a predetermined longitudinal length and a cross-section that includes at least one guide groove. The guide groove may include a T-slot formed in the extrusion. The mechanical structure also includes a sliding member mounted directly on the extrusion for integrating guided linear motion along at least a portion of the mechanical structure. Structure for reducing wear between the sliding member and the extrusion is provided. The reducing wear structure is connected to the sliding member and has a portion adapted to be received within the guide groove of the extrusion. The portion of the reducing wear structure that is received in the guide groove of the extrusion may include an alignment key. In a preferred embodiment, the extrusion and sliding member are formed from either aluminum or an aluminum alloy. A preferred aluminum alloy is 6105-T5 aluminum alloy. Also in a preferred embodiment, the reducing wear structure is constructed from a material having a low coefficient of friction (i.e., a high lubricity). This material may be an ultra high molecular weight polyethylene.

In a preferred embodiment, the sliding member includes a guide block and the reducing wear structure includes a wear pad having a first wear surface for contacting an adjacent surface of the extrusion. The wear pad also has an alignment key adapted to be received within the T-slot of the extrusion. In this preferred embodiment, the frame may be modular. The frame may also have at least two extrusions and structure for connecting the extrusions together. The guide block may be substantially U-shaped in cross-section. The preferred embodiment also includes attaching structure for attaching the wear pad to the guide block. The attaching structure may releasably attach the wear pad to the guide block. The attaching structure may include at least one fastener that is received in an opening formed in the guide block and a tapped threaded hole formed in the wear pad.

The alignment key may be integrally formed on the wear pad. The alignment key may be substantially rectangular in cross-section. Furthermore, the alignment key may also extend along the longitudinal length of the wear pad.

In one embodiment, there are three wear pads attached to three separate portions of a guide block. Each of the wear pads has a first wear surface for contacting an adjacent surface of the extrusion and an alignment key. Each alignment key is adapted to be received within a separate T-slot of the extrusion. In yet another embodiment, there are four wear pads attached to four separate portions of the guide block. In this embodiment, each wear pad has a first wear surface for contacting an adjacent surface of the extrusion and an alignment key. Each alignment key is adapted to be received within a separate T-slot of the extrusion.

The present invention provides a method of constructing a mechanical structure so as to integrate guided linear motion along at least a portion of the mechanical structure. The method includes assembling the static mechanical structure such that at least one aluminum extrusion is utilized in assembling the mechanical structure. The aluminum extrusion has a cross-section that includes at least one T-slot. The method further includes mounting at least one aluminum linear bearing directly on the extrusion such that the linear bearing is movable along at least a portion of a longitudinal length of the extrusion. The method additionally includes releasably mounting wear pads on the linear bearing such that the wear pads are disposed between at least those surfaces of the aluminum linear bearing and the aluminum extrusion that come in physical contact with one another. The method may further include forming the aluminum extrusion and the linear bearing from 6105-T5 aluminum alloy. The method may also further include forming the wear pads from a material having a low coefficient of friction (i.e., a high lubricity). The material utilized in forming the wear pads may be constructed from ultra high molecular weight polyethylene.

The above-described mechanical structure and method associated with assembling this mechanical structure has many advantages. One of those advantages includes that the mechanical structure can have sliding linear motion along at least one extrusion utilized in constructing the mechanical structure. This sliding linear motion is achieved through the use of a linear bearing assembly that mounts directly to the extrusion. No guide rail separately mounted to the extrusion is necessary for the linear bearing assembly. That is, the linear bearing assembly freely moves on the extrusion itself. Wear reducing structure, such as wear pads, are the only items disposed between the linear bearing and the extrusion. This wear reducing structure prolongs both the life of the linear bearing and the extrusion. The absence of a guide rail or similar structure disposed between an extrusion and a linear bearing has the advantage of reducing the components necessary to achieve linear motion along at least a portion of a mechanical structure. This reduction in the number of components has a cost savings benefit. A labor savings benefit is also achieved in that a guide rail does not have to be separately attached to an extrusion, via such means as welding, of a mechanical structure in order to achieve linear motion thereon.

Other objects, advantages and novel features of the present invention will become apparent from the following detailed description of the invention when considered in conjunction with the accompanying drawings.

BRIEF DESCRIPTION OF THE DRAWINGS

FIG. 1 shows a perspective view of an extrusion of the type used with the present invention;

FIG. 2 shows a cross-sectional view of FIG. 1 taken along line 2—2 of FIG. 1;

FIG. 3 shows an enlarged view of a portion of FIG. 2;

FIG. 4 shows an end fastener used to interconnect extrusions of the type used with the present invention;

FIG. 5 shows a linear bearing assembly mounted on an extrusion of the type shown in FIGS. 1-3;

FIG. 6 shows a left side view of the linear bearing assembly of FIG. 5;

DETAILED DESCRIPTION OF THE DRAWINGS

Figure 7:
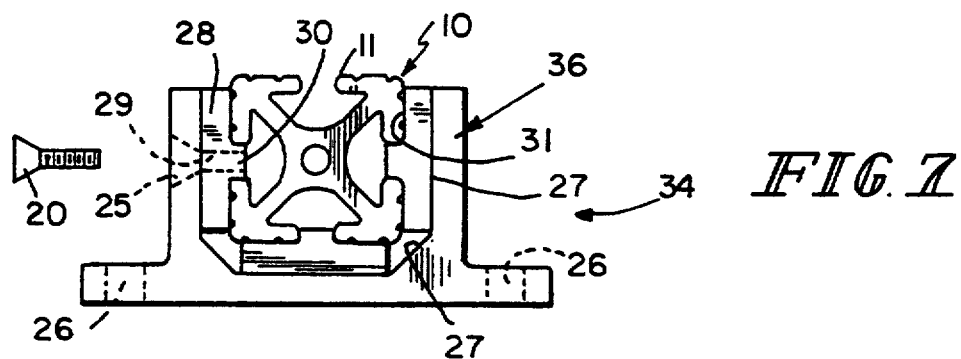
FIG. 7 shows another embodiment of a linear bearing assembly mounted on an extrusion.

FIG. 1 shows an embodiment of an extrusion 10. Extrusion 10 includes a T-slot channel 12 formed in a periphery 11 thereof that is used to both connect extrusion 10 with other extrusions via such things as fasteners, screws, nuts, studs, brackets, plates, or hinges and to mount a linear bearing assembly, both of which are discussed below. Extrusion 10 also has a hollow center 14 that can be used to route such things as electrical wires or pressurized air therethrough. As can be seen in FIG. 1, extrusion 10 has four corners 16 that define a generally rectangular shape for extrusion 10.

Extrusion 10 is preferably constructed from either aluminum or an aluminum alloy such as 6105-T5 aluminum alloy. Aluminum has many advantages over other materials utilized in constructing mechanical structures. For example, aluminum weighs only about one-third as much as iron, steel, copper, or brass. The lighter weight of aluminum has at least one advantage of reduced shipping and handling costs. Another beneficial characteristic of aluminum is that its strength and lightness combine into a strength-to-weight ratio (a material's ultimate tensile strength divided by its density) superior to that of copper, carbon steel (A36), or stainless steel. This high strength-to-weight ratio has resulted in aluminum finding application as a preferred structural metal in such industries as aerospace, machine building, and transportation.

Construction of mechanical structures via the use of extrusions that are interconnected as described above has several advantages. Some of these advantages include that welding, such as is required to interconnect mechanical structures constructed from metals such as iron, copper, or stainless steel, is not required. Because welding is not required, there is no heat stress and warpage to extrusions. Furthermore, labor costs and material costs associated with welding are reduced. Another advantage, as discussed above, is the lighter weight of aluminum compared to metals such as iron, copper, or stainless steel. Aluminum extrusions are also easy to fabricate and machine. Furthermore, aluminum does not have to be painted in order to reduce its tendency to rust (oxidize). Extrusions are also reusable.

FIG. 2 illustrates a cross-sectional view of FIG. 1 taken along 2—2 thereof. Structures shown in FIG. 1 are also visible in FIG. 2. In addition, grooves 18 formed in the periphery of extrusion 10 are visible. Also visible are rails 19 that lie between grooves 18. Grooves 18 and corresponding rails 19 are also shown in FIG. 1.

FIG. 3 illustrates an enlarged view of extrusion 10 shown in FIG. 2. A decline of approximately two degrees (2°) from corner 16 of extrusion 10 to a centerline 17 of T-slot channel 12 is shown. This "drop lock" feature acts as a lock washer in that it spring loads a fastener (not shown in FIG. 3, see FIG. 4 below) used to interconnect two extrusions as the fastener is tightened. Once in place in an extrusion having this drop lock feature, a fastener will not loosen, even under heavy vibration. FIG. 4 illustrates an end fastener 15 of the type that may be utilized to join two extrusions, such as the type illustrated by extrusion 10, together. End fastener 15 could be utilized in conjunction with the drop lock feature illustrated in FIG. 3.

FIG. 5 illustrates an embodiment of a linear bearing assembly 22 mounted on an extrusion 10. Linear bearing assembly 22 includes a guide block 24 having at least one mounting aperture 26 formed therein. As with extrusions 10, guide block 24 of linear bearing assembly 22 may be constructed of aluminum or an aluminum alloy in order to take advantage of the above-described features associated with use of such material. Wear pads 28 are shown as releasably attached to an interior periphery 27 of guide block 24 by fastener 20. Wear pads 28 have tapped threaded holes 29 that receive fasteners 20. Guide block 24 has a tapered opening 25 formed therein such that fastener 20 mounts flush against the outside surface of guide block 24. Although wear pad 28 is shown as having a tapped threaded hole 29 and tapered opening 25 in guide block 24 is shown as being non-threaded, it is to be understood that, in all or some of the embodiments of the present invention, tapered opening 25 may be threaded and hole 29 may be non-threaded such that fastener 20 mounts oppositely as shown in FIG. 5. That is, fastener 20 may first pass through a non-threaded hole in wear pad 28 and then through a threaded opening in guide block 24. Wear pads 28 are the only part of linear bearing assembly 22 that ever needs replacing. Replacement is easily and quickly accomplished by removal of fasteners 20 that mount wear pads 28 to guide block 24.

Wear pads 28 each have alignment keys 30 formed on first surfaces 31 thereof that engage T-slot channels 12 of extrusion 10. Alignment keys 30 ride in T-slot channels 12 such that guide block 24 is secured to extrusion 10 and smoothly slides thereon for at least a portion of the length of extrusion 10. Wear pads 28 are preferably constructed from material having a low coefficient of friction. That is, wear pads 28 are preferably constructed from a material having a high lubricity. One such material is Ultra High Molecular Weight Polyethylene (UHMWPE). As can be seen from FIG. 5, first surfaces 31 of wear pads 28 extend beyond T-slot channels 12 and on to at least a portion of the periphery of extrusion 10. Wear pad 28 is intended to be disposed between those surfaces of guide block 24 and extrusion 10 that would otherwise come in contact if guide block 24 were merely mounted to extrusion 10 via structure similar to alignment key 30.

FIG. 5 shows three wear pads 28 which are attached to guide block 24. Three alignment keys 30 formed on first surfaces 31 of wear pads 28 engage three different T-slot channels 12 formed in extrusion 10. Use of three alignment keys 30 that engage three separate T-slot channels 12 of extrusion 10 secures linear bearing assembly 22 in all axes.

FIG. 6 shows a left side view of the linear bearing assembly 22 of FIG. 5. As can be seen from FIG. 6, there are two mounting apertures 26. Mounting apertures 26 can be used to mount linear bearing assembly 22 to other items such as, for example, another extrusion. Tapped threaded holes 29 of wear pads 28 are also shown.

Figure 8:
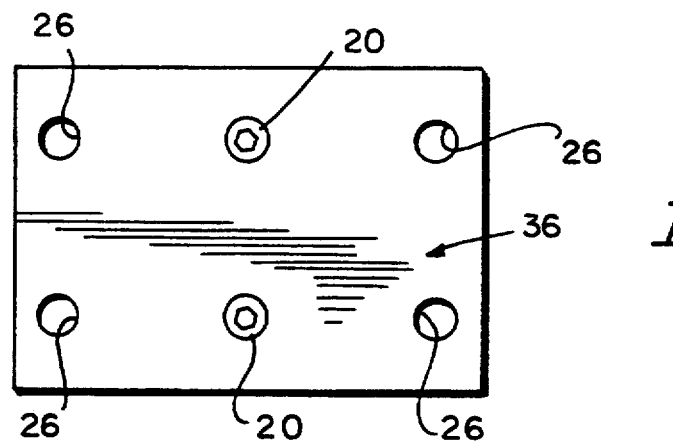
FIG. 8 shows a bottom view of the linear bearing assembly of FIG. 7.

FIG. 7 shows an alternative embodiment of a linear bearing assembly 34. Linear bearing assembly 34 includes a guide block 36 mounted on extrusion 10 via alignment keys 30 of wear pads 28 as discussed above in connection with FIGS. 5 and 6. FIG. 7 also shows the use of three wear pads 28 that have three alignment keys 30 that engage three separate T-slot channels 12 of extrusion 10. As with linear bearing assembly 22 of FIG. 5, use of three alignment keys 30 that engage three separate T-slot channels 12 of extrusion 10 secures linear bearing assembly 34 in all axes. FIG. 8 shows a bottom view of the linear bearing assembly 34 of FIG. 7. As can be seen from FIG. 8, linear bearing assembly 34 has four mounting apertures 26 to allow for mounting of bearing assembly 34 to, for example, an extrusion as discussed above in connection with linear bearing assembly 22. Fasteners 20 are also shown as releasably attaching wear pads 28 to guide block 36.

As can be seen in FIGS. 5 and 7, linear bearing assemblies 22 and 34 mount directly on extrusions 10. Use of guide rails on which bearing assemblies 22 and 34 are mounted is thus unnecessary. This has the advantage of reducing the number of components necessary to provide guided linear motion. In addition, labor necessary to attach a guide rail to an existing mechanical structure is eliminated.

Figure 9:
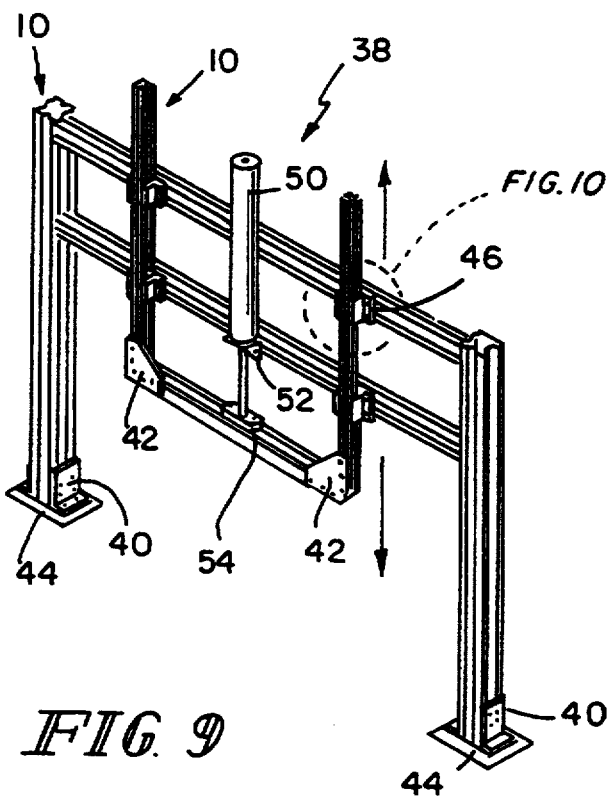
FIG. 9 shows an assembly constructed with extrusions and a linear bearing assembly of the present invention.
Figure 10:
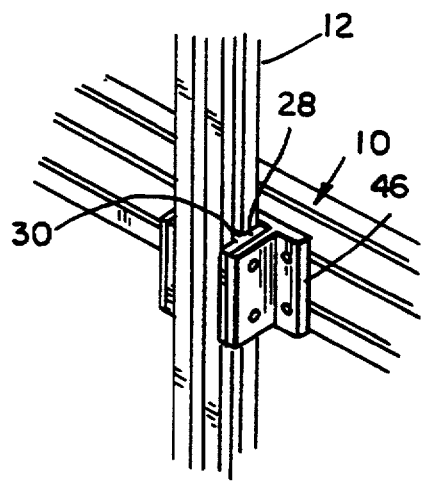
FIG. 10 shows an enlarged view of a portion of FIG. 9.

FIG. 9 shows a mechanical structure constructed with components of the present invention. FIG. 9 illustrates a cutter frame with linear bearing assembly 38. Extrusions 10 are interconnected together as described above with structure such as corner brackets 40 and joining plates 42. Floor or ground support for cutter frame with linear bearing assembly 38 is provided by base supports 44 connected to extrusions 10 via corner brackets 40. Linear bearing assemblies 46 are shown as providing motion in the direction of arrows 48 along portions of the longitudinal length of extrusions 10. As can be seen in FIG. 9 and as was discussed above, no separate guide rails are necessary for use of linear bearing assemblies 46 in constructing a mechanical structure. A pneumatic cylinder 50 connected to extrusions 10 of the present invention via mounting brackets 52 and 54. Pneumatic cylinder 50 controls both the rate at which movement of cutter frame with linear bearing assembly 38 occurs as well as the range of motion of cutter frame with linear bearing assembly 38. FIG. 10 illustrates an enlarged view of linear bearing assembly 46 shown in FIG. 9. Some of the structure relating to extrusion 10 as well as structure common to linear bearing assemblies 22 and 34 are designated with like reference numerals.

Figure 11:
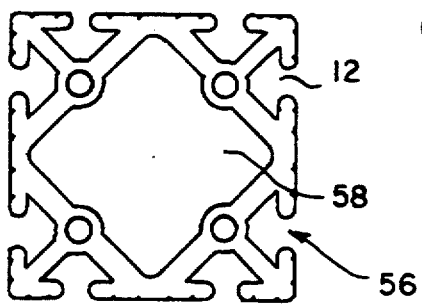
FIGS. 11-14 show alternative embodiments of extrusions which may be used with the present invention.

FIG. 11 illustrates an alternative embodiment of an extrusion 56. Extrusion 56 has a center 58 which can be used to run things such as air lines, electrical wires, or a pressure or vacuum manifold. As can be seen from FIG. 11, extrusion 56 has a plurality of T-slot channels 12 for use with fasteners as described above to interconnect extrusion 56 with other extrusions. A linear bearing assembly (not shown) could be constructed to mount on extrusion 56. For example, three wear pads each having two alignment keys could be provided such that three of the four sides of extrusion 56 are engaged. The two alignment keys on each wear pad could engage the corresponding two T-slot channels 12 formed in each of the four slots of extrusion 56.

Figure 12:
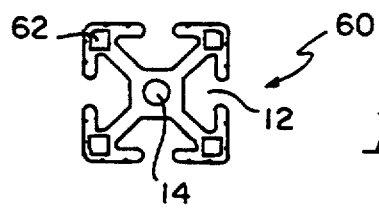

FIG. 12 shows another alternative embodiment of an extrusion 60. Extrusion 60 has a plurality of apertures 62. Apertures 62 are placed in extrusion 60 so that it may be used for applications that do not require the structural strength and weight of heavier extrusions such as, for example, those shown in FIGS. 1-2 and FIG. 11. Extrusion 60 also has a plurality of T-slot channels 12 and a center 14 which functions as described above in connection with FIGS. 1 and 2. A linear bearing assembly may also be used with extrusion 60. For example, either of linear bearing assemblies 22, 34, or 46 could be utilized.

Figure 13:
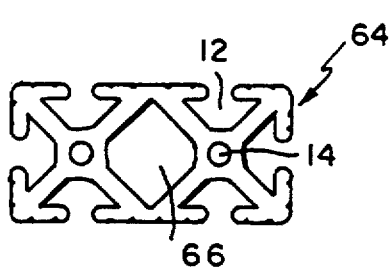

FIG. 13 shows yet another alternative embodiment of an extrusion 64. Extrusion 64 is larger in width than, for example, the extrusions shown in FIGS. 1-2 and FIG. 12. Center 66 of extrusion 64 is large enough such that air lines, electrical wires, or pressure or vacuum manifolds may be run therethrough. A plurality of T-slot channels 12 and two centers 14 are also present on extrusion 64. These structures have the above-described features associated with them.

Figure 14:
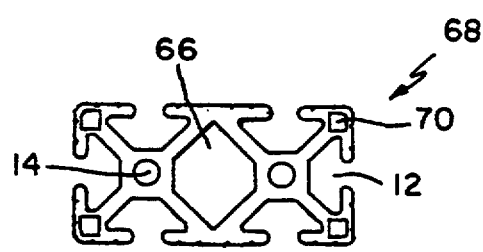

FIG. 14 shows yet another alternative embodiment of an extrusion 68. Extrusion 68 has the same center 66 as extrusion 64 shown in FIG. 13 as well as apertures 70 running therethrough. Apertures 70 reduce the structural strength and weight of 68 as compared with, for example, extrusion 64 shown in FIG. 13. This allows extrusion 68 to be used in applications not requiring the degree of structural strength and weight as that of extrusion 64 shown in FIG. 13.

Figure 15:
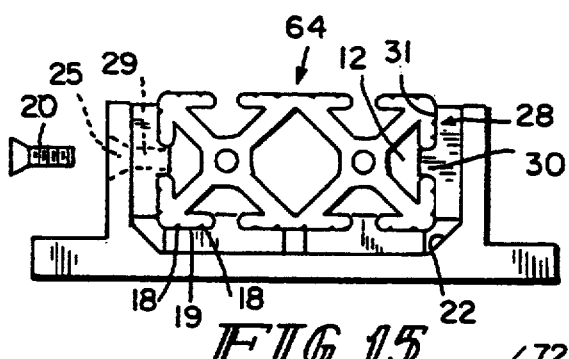
FIG. 15 shows an embodiment of a linear bearing assembly for mounting on an extrusion of the type shown in FIGS. 13 and 14.

FIG. 15 shows an alternative embodiment of a linear bearing assembly 72 for mounting on either of extrusions 64 or 68. FIG. 15 shows linear bearing assembly 72 as being mounted on extrusion 64 shown in FIG. 13. As can be seen in FIG. 15, linear bearing assembly 72 has four wear pads 28 that each have alignment keys 30 which engage T-slot channels 12 formed in three of the four sides of linear bearing assembly 72. Use of four alignment keys 30 to engage the four T-slot channels 12 formed in three of the four sides of extrusions 64 and 68 secures linear bearing assembly 72 in all axes.

Figure 16:
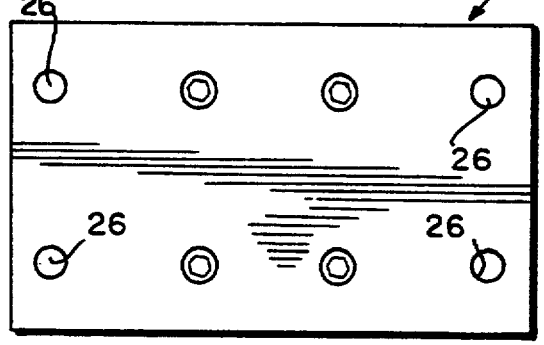
FIG. 16 shows a bottom view of the linear bearing assembly of FIG. 15.

FIG. 16 shows a bottom view of linear bearing assembly 72 of FIG. 15. As can be seen in FIG. 16, linear bearing assembly 72 has four mounting apertures 26 to allow for double mounting of bearing assembly 72 to, for example, an extrusion.

Figure 17:
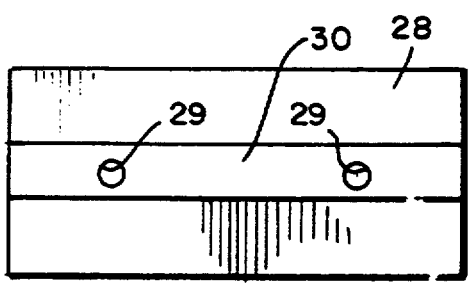
FIG. 17 shows an end view of a wear pad.

FIG. 17 shows an end view of wear pad 28. Tapped threaded hole 29 and alignment key 30 are also shown. As can be seen in FIG. 17, wear pad 28 is substantially T-shaped in cross-section.

Figure 18:
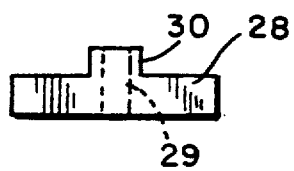
FIG. 18 shows a top view of the wear pad of FIG. 17.

FIG. 18 shows a top view of wear pad 28 shown in FIG. 17. Tapped threaded holes 29 are shown as extending through alignment key 30 which extends along the longitudinal length of wear pad 28.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

I claim:

1. A mechanical structure comprising:
   at least one extrusion having a plurality of sides and a longitudinal slot generally centrally positioned in each side;
   a guide block having a plurality of guide surfaces disposed adjacent respective ones of said plurality of sides of the extrusion;
   a plurality of wear pads disposed between respective surfaces of the extrusion and guide surfaces of the guide block to reduce friction between the same, each wear pad having an alignment key positioned to be received within one of the slots of the extrusion, and a plurality of wear surfaces in load bearing contact with the adjacent surfaces of the extrusion.

2. The mechanical structure of claim 1, wherein the guide block includes a plurality of intersecting walls, at least one of which extends beyond a point of intersection with another wall thereby forming a flange that is adapted to couple to a member of the mechanical structure.

3. The mechanical structure of claim 2, wherein the flange is configured to include an aperture that receives a fastener for coupling to the member of the mechanical structure.

4. The mechanical structure of claim 1, wherein the guide block is generally U-shaped in cross-section.

5. The mechanical structure of claim 1, wherein there are two extrusions coupled together side by side, the guide block is generally U-shaped in cross-section, and there are four wear pads coupled to three inner surfaces of the guide block.

6. The mechanical structure of claim 1, wherein the extrusion has a generally rectangular cross-section.

7. The mechanical structure of claim 1, wherein the alignment key is positioned to lie in the middle of the body of each wear pad so that each wear pad has a generally T-shaped cross-section.

8. The mechanical structure of claim 7, wherein each wear pad is integrally formed.

9. The mechanical structure of claim 1, further comprising means for coupling the wear pads to the guide surfaces of the guide block.

10. The mechanical structure of claim 9, wherein the coupling means includes a plurality of fasteners, and further wherein the guide block and wear pads are configured to include a plurality of apertures that receive the fasteners.

11. The mechanical structure of claim 1, wherein the extrusion and guide block are formed from one of aluminum and an aluminum alloy.

12. The mechanical structure of claim 11, wherein the aluminum alloy is 6105-T5 aluminum alloy.

13. The mechanical structure of claim 1, wherein the wear pad is made from ultra high molecular weight polyethylene.

14. An apparatus for providing guided linear motion in a mechanical structure, comprising:
   an extrusion having a generally rectangular cross-section and a channel on each side of the extrusion;
   a linear slide for slidably receiving the extrusion in one of a plurality of orientations, the linear slide including a housing having a generally U-shaped cross-section and a plurality of bearings positioned, respectively, along inner surfaces of the U-shaped housing, each of the bearings having a body and a member positioned to lie within one of the channels of the extrusion so that the bearings cooperate with adjoining surfaces of the extrusion and channel in carrying load forces; and
   means for attaching the bearings to the housing.

15. The apparatus of claim 14, wherein the housing is configured to include a flange adapted for coupling to a member of the mechanical structure.

16. The apparatus of claim 15, wherein the flange is configured to include an aperture that receives a fastener for coupling the linear slide to the member of the mechanical structure.

17. The apparatus of claim 14, wherein the housing includes a plurality of walls of at least two different sizes, that are coupled together.

18. The apparatus of claim 17, wherein the housing is integrally formed.

19. The apparatus of claim 14, wherein there are two extrusions coupled together side by side and four wear pads coupled to three inner surfaces of the housing.

20. The apparatus of claim 14, wherein each channel of the extrusion has a generally T-shaped cross-section.

21. The apparatus of claim 14, wherein the bearing member is positioned to lie in the middle of the body of each bearing so that each bearing has a generally T-shaped cross-section.

22. The apparatus of claim 14, wherein the attaching means includes a plurality of fasteners, and further wherein the housing and bearings are configured to include a plurality of apertures that receive the fasteners.

23. The apparatus of claim 14, wherein the extrusion and housing are formed from one of aluminum and an aluminum alloy.

24. The apparatus of claim 23, wherein the aluminum alloy is 6105-T5 aluminum alloy.

25. The apparatus of claim 14, wherein the wear pad is made from ultra high molecular weight polyethylene.

* * * * *